United States Patent

[11] 3,552,515

| [72] | Inventor | Fujihiko Tomita<br>Shizuoka-ken, Japan |
|---|---|---|
| [21] | Appl. No. | 786,604 |
| [22] | Filed | Dec. 24, 1968 |
| [45] | Patented | Jan. 5, 1970 |
| [73] | Assignee | Yamaha Hatsudoki Kabushiki Kaisha<br>Shizuoka-ken, Japan |

[54] FRONT WHEEL DEVICE FOR SNOWMOBILES
10 Claims, 4 Drawing Figs.

[52] U.S. Cl. .................................................. 180/5,
280/8
[51] Int. Cl. .................................................. B62b 13/18
[50] Field of Search .......................................... 180/3, 4, 5,
6; 280/8, 9, 10, 11, 13

[56] References Cited
UNITED STATES PATENTS
2,424,641 7/1947 Swanson ..................... 280/414UX
2,312,071 2/1943 Broadwater ................. 180/5
3,477,734 11/1969 Albertson ................... 180/5X
3,480,096 11/1969 Hammitt .................... 180/5

*Primary Examiner*—Richard J. Johnson
*Attorney*—Berman, Davidson and Berman

ABSTRACT: A front wheel device, for a snowmobile having a power driven endless track and a steerable ski, comprising a vertically elongated strut, a wheel journaled at the bottom of the strut, and a ski supporter. The upper end of the strut is removably mountable on the steering column, which pivotally suspends the steering ski under the body of the snowmobile, with the ski supporter lifting the ski from ground engagement, thereby enabling steerage of the snowmobile by the wheel while running over snowless and ice-free roads and terrain.

PATENTED JAN 5 1971

3,552,515

INVENTOR.
FUJIHIKO TOMITA.
BY
Berman, Davidson & Berman.
ATTORNEYS.

FRONT WHEEL DEVICE FOR SNOWMOBILES

This invention relates to a steering device for a snowmobile, and more particularly to a front wheel device having a wheel and a ski supporter carried by a strut which is to be removably mounted on a ski column depending from the front portion of the body of the snowmobile.

Usually a conventional snowmobile is designed to be steered by steering skis suspended under the front portion of the body. In actual use, however, it often becomes necessary for the driver to move and control the snowmobile on snowless roads, or other terrain, where the steering skis are useless. It is then necessary to carry the snowmobile to a snow-covered surface, a task which is very difficult for the driver because of the weight of the snowmobile.

The primary object of this invention is, therefore, to provide front wheel devices for a motor driven snowmobile of the type having one or more endless tracks installed at the rear portion of its body and a pair of steering skis suspended under the front portion of its body, the said front wheel devices, when attached without removing the said steering skis from the snowmobile, enabling easy movement and steerage of the snowmobile in snowless areas where the steering skis are useless.

Another important object of the invention is to provide front wheel devices, having the above described characteristics, said wheels being individually mounted on a pair of front struts each having a ski supporter, said struts being attached to ski columns extending below the front portion of the body of the snowmobile, the said ski supporters preventing the steering skis from pitching and pivotal swinging in course of the snowmobile running of said wheels on snowless roads and terrain.

A further important object of this invention is to provide a front wheel device, having the above-described characteristics and features, wherein the said device can be readily and easily mounted on and removed from the bottom of the front portion of the body of the snowmobile.

Another object of the invention is to provide a front wheel device, having the above-described features and characteristics, wherein the steering ski is prevented from bouncing as well as from pitching and pivotal swinging, said ski support serving to load the elastic leaf spring assembly which mounts the steering ski.

The novel features that are considered characteristic of the invention are set forth particularly in the appended claims. The invention, itself, however, both as to its organization and its operation, together with additional objects and advantages thereof, will best be understood from the following description of a specific embodiment when read in connection with the accompanying drawings, wherein like reference characters indicate like parts throughout the several FIGS. and in which:

Figure 1:
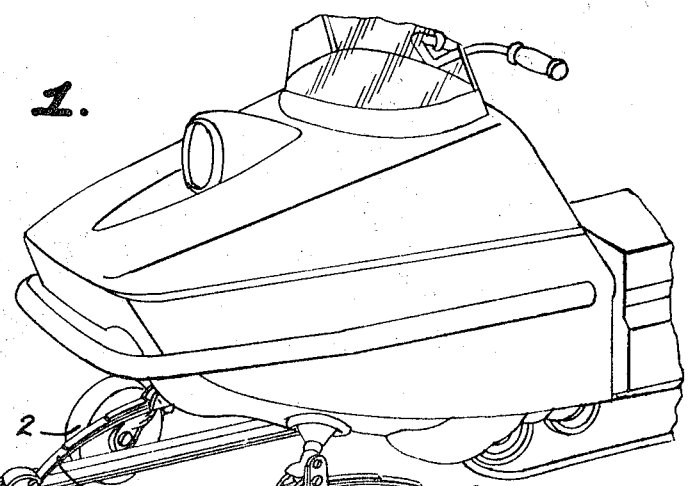
FIG. 1 is a fragmentary front end perspective of a snowmobile incorporating the wheel device of the invention.
Figure 2:
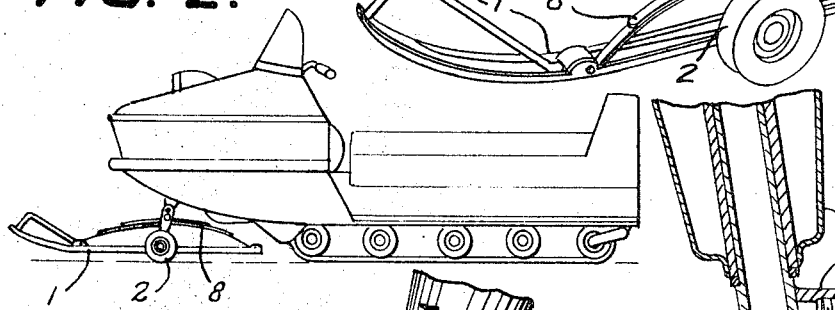
FIG. 2 is a side view of the snowmobile of FIG. 1.

The front wheel device according to this invention is ordinarily designed to be used in pairs with corresponding pairs of steering skis, as shown in FIG. 1. However, for more concise and clearer indications, FIGS. 2—4 of the drawings illustrate only one of the devices installed on the snowmobile and its cooperation with one of the pair of steering skis.

In FIG. 1 is shown a wheel 2 which enables the steerage of the snowmobile to which it is attached on snowless and unfrozen roads, or other terrain, where the steering ski 1 is useless. The ski 1 is suspended from a steering column 4, FIG. 3, in conventional manner under the front portion of the snowmobile body, a leaf spring assembly 8 elastically supporting the ski.

Figure 3:
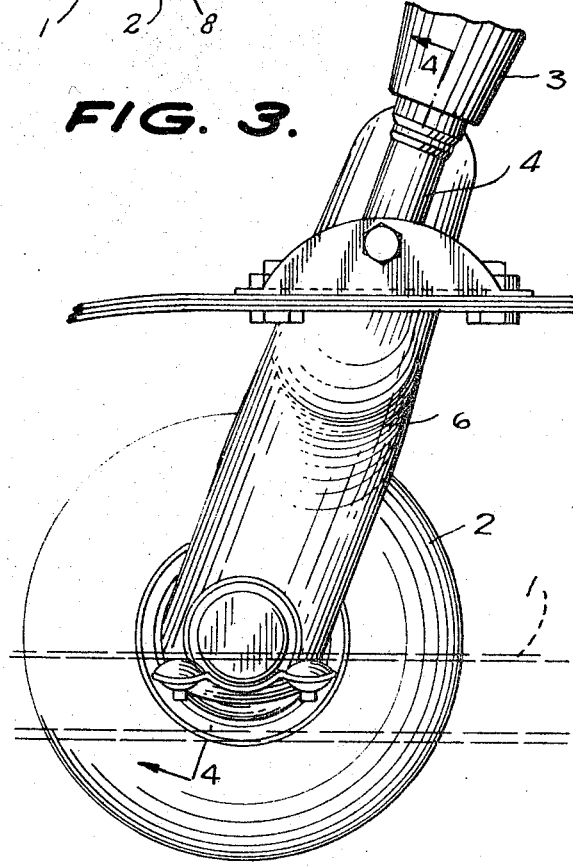
FIG. 3 is a fragmentary side elevational view showing the inside surfaces of the front wheel device.
Figure 4:
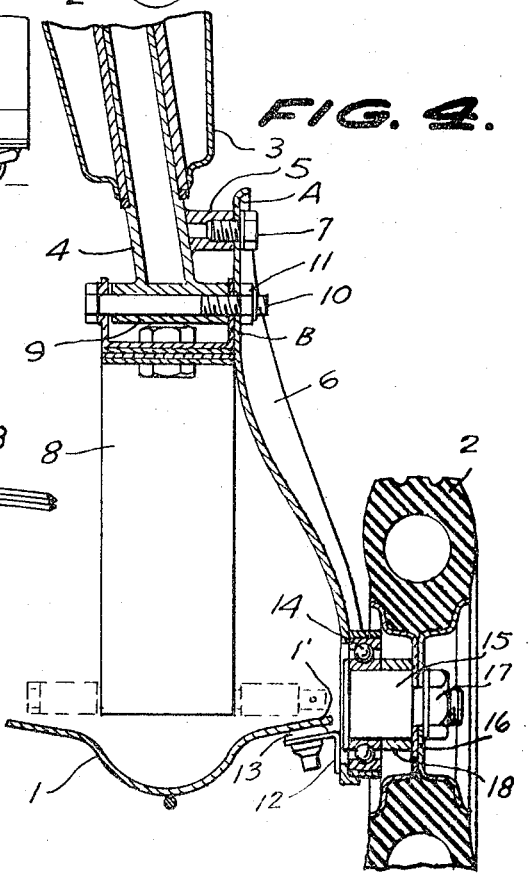
FIG. 4 is a sectional view, taken on line 4—4 of FIG. 3, and looking in the direction of the arrows.

As best shown in FIGS. 3 and 4, wheel 2 is mounted on a strut 6 secured at its upper end A by a bolt 7 threaded into the bore of a short sleeve 5 one end of which is welded, or otherwise appended, on the ski column 4. The ski column 4 is rotatably journaled in a downwardly tapering tube 3, and terminates at it is lower end in a transverse bearing sleeve 9 through which passes pivot bolt 10. Secured against the bearing sleeve 9, through an intervening unnumbered U-shaped bracket and nut 11, is the upper portion B of the strut 6. The arched leaf spring assembly 8, which mounts the ski at its lower end, is bolted in a conventional manner to the base of said unnumbered bracket whose legs have apertures in which pivot bolt 10 is journaled. Thus, the added strut 6 carrying wheel 2 is installed without removing the steering ski 1 from the snowmobile.

The strut 6 also carries a ski supporter composed of an inverted L-shaped metal bracket 12 and a rubber stop member 13. The vertical leg of the support bracket is secured on the inside of the lower end of the strut. The bottom ski 1 is lifted and seats on stop 13, which is affixed to the top surface of the horizontal leg of the bracket so that the steering ski is elastically supported at its outside edge 1' by loading to the leaf spring assembly 8.

A ball bearing race 14 is mounted in any suitable manner on the bottom of the strut 6 for rotatably seating stub axle 15, and rim 16 of wheel 2 is fastened to a reduced end portion of the axle by nut 17 threaded on the reduced outer end of the axle to press the rim against spacer collar 18 which surrounds the stub axle and holds the bearing race.

The strut 6 being secured at two spaced end portions A and B respectively, to the boss 5 and the bearing sleeve 9, causes the ski supporter 12, 13 to elastically suspend the steering ski 1 lifting the same somewhat to compress the leaf spring assembly 8. Thus, the leaf spring assembly and the ski supporter together prevent the steering ski 1 from touching the ground, and from bouncing, or pitching, or pivotally swinging about transverse pivot 10 while the snowmobile runs over snowless roads, or unfrozen terrain.

The wheel strut 6 is curved, or arched, in a vertical section to provide clearance for the ski and in channel shaped in horizontal section throughout its length for rigidifying purposes. Since the wheel strut is fixedly secured only at its upper end of the rotatable steer ski column, the wheel 2 will turn with the column when the snowmobile is steered in conventional manner. When the wheel turns, the stop member remains against the undersurface of the ski 1 holding the latter above the ground in the same relative position since the ski also turns with the ski column.

From the above it is apparent that a single or pair of wheels, as appropriate, may be readily attached to a snowmobile when it is necessary to travel over snowless and unfrozen ground, or road surfaces. During such wheeled travel the vehicle is easily steered, utilizing the conventional steering mechanism on the vehicle for turning the skis. The skis are held out of contact with the ground and are prevented from bouncing or pitching in forward-or-aft directions about their transverse pivot supports 10.

When the vehicle reaches a snow or ice-clad road, slope or other suitable terrain where it is desired to use the steering skis, it is easy to remove the wheel, or wheels 2. This is accomplished by merely unthreading the bolt 7 and the nut 11 and taking off the wheel holding strut 6. The bolt 7 and nut 11 should be rethreaded in their places pending later replacement of the wheel on the vehicle.

It will be apparent from the above description that the front wheel device of the invention can be easily and quickly mounted, or removed. The steering skis are stabilized in elevated position, but free to turn when the wheels are in use. Consequently, the invention provides the convenient use of the snowmobile even on snowless and iceless terrain.

It should be further apparent that the invention is not restricted to the illustrated device. The wheel device may be mounted on the rear, or elsewhere, compatible with the position of the steering ski, or skis. The details of fastening the wheel to its strut support and the support to the steering ski column may vary as circumstances dictate. Similar remarks apply to the design of the ski lifter.

It should be recognized that the present wheel device is applicable to a snowmobile having only one front, or one rear steering ski as well as to vehicles having pairs of skis in these positions. With minor changes, the wheel device can be adapted to various types of ski mounts, or suspensions.

Although a certain specific embodiment of this invention has been illustrated and described, it is obvious that many modifications thereof are possible. The invention, thereof, is not intended to be restricted to the exact showing of the drawings and description thereof, but is considered to include reasonable and obvious equivalents.

I claim:

1. In a snowmobile of the type having a steering ski structure including a ski, shock-absorbing means and support means mounting said ski to a transverse pivot at the bottom of a steering column, the improvements comprising a strut, means for removably mounting said strut on said steering column, a wheel journaled in said strut, and a ski supporter carried by said strut and engaging said steering ski structure so as to compress said shock-absorbing means and lift and hold the ski above the wheel-engaging surface in such manner as to avoid pitching and pivotal movements about said transverse pivot.

2. In a snowmobile the combination set forth in claim 1, wherein said shock-absorbing means is a downwardly bowed, leaf spring assembly secured to a bracket at substantially the center of its upper surface and at its bottom ends to said ski, said bracket being pivotally mounted on said transvers pivot means, and said ski supporter frictionally engaging the undersurface of said ski at the outer edge thereof.

3. In a snowmobile the combination set forth in claim 1, wherein the said wheel is installed on the outside of the lower end of the said strut, the said ski supporter being secured to the inner surface and the lower end of said strut and being adapted to engage and lift the steering ski at its ground-touching face of one edge, and said means for removably attaching the strut cooperating with the upper end of the strut.

4. In a snowmobile the combination set forth in claim 1, wherein said means for removably mounting the strut comprises a nut threadable on a portion of said transverse pivot.

5. In a snowmobile the combination set forth in claim 4, wherein said means for removably mounting the strut additionally comprises a bolt threadable into a sleeve affixed at one end to said steering column.

6. In a snowmobile the combination set forth in claim 1, wherein said ski supporter comprises a bracket having one leg secured to said strut and another leg adapted to engage the underside of said ski and lift the same against the pressure of said shock-absorbing means.

7. In a snowmobile the combination set forth in claim 6, wherein said bracket comprises an inverted L-shaped member having its said one leg secured to the inner surface of the lower end of said strut and its said other leg capped by a rubber stop for engaging the bottom of the ski.

8. In a snowmobile the combination set forth in claim 1, wherein said strut comprises a vertically elongated sheet of rigid material, said sheet having a pair of apertures for said mounting means near its upper end and being bowed outwardly in the direction of its lower end, and a bearing race for said wheel secured to its lower end.

9. In a snowmobile the combination set forth in claim 8, wherein said sheet comprising the strut is channel-shaped in horizontal cross section to strengthen and rigidify the same.

10. A wheel device, for a snowmobile of the type equipped with a steering ski structure including a ski, a resilient shock-absorbing means and support means connected to the bottom of the steering column by transverse pivot means, comprising a strut, means for removably mounting the strut on said steering column, a wheel journaled in said strut, and a ski supporter carried on said strut and adapted to engage said steering ski structure so as to compress said shock-absorbing means and lift and hold said ski above the wheel supporting surface in such manner as to avoid pivotal movements around the transverse pivot.